(12) United States Patent
Peist

(10) Patent No.: US 11,823,103 B2
(45) Date of Patent: Nov. 21, 2023

(54) DYNAMIC LIVE CONNECTIONS FOR ON-DEMAND TECHNICAL SUPPORT

(71) Applicant: FanTazTech LLC, Pennington, NJ (US)

(72) Inventor: Nicholas K. Peist, Lawrenceville, NJ (US)

( * ) Notice: Subject to any disclaimer, the term of this patent is extended or adjusted under 35 U.S.C. 154(b) by 0 days.

(21) Appl. No.: 17/751,173

(22) Filed: May 23, 2022

(65) Prior Publication Data

US 2022/0284376 A1 Sep. 8, 2022

Related U.S. Application Data

(63) Continuation of application No. 16/578,315, filed on Sep. 21, 2019, now Pat. No. 11,341,436.

(60) Provisional application No. 62/734,976, filed on Sep. 21, 2018.

(51) Int. Cl.
  *G06Q 10/0631* (2023.01)
  *H04L 9/40* (2022.01)
  *H04L 67/025* (2022.01)

(52) U.S. Cl.
  CPC ........... *G06Q 10/063112* (2013.01); *G06Q 10/06316* (2013.01); *G06Q 10/063114* (2013.01); *H04L 63/083* (2013.01); *H04L 63/101* (2013.01); *H04L 67/025* (2013.01)

(58) Field of Classification Search
  None
  See application file for complete search history.

(56) References Cited

U.S. PATENT DOCUMENTS

| 6,938,048 B1 * | 8/2005 | Jilk ...................... G06Q 10/06 705/7.14 |
| 7,155,400 B1 | 12/2006 | Jilk |
| 8,219,430 B1 | 7/2012 | Thompson |
| 10,062,042 B1 | 8/2018 | Kelly |

(Continued)

FOREIGN PATENT DOCUMENTS

WO    WO-2014053048 A1 *    4/2014    ......... B25B 23/1422

OTHER PUBLICATIONS

Benoit "IT in SMBs: Technical assistance on demand VS managed services. Which to choose?", Sep. 2017, Present Blog—IT Thought Leadership, pp. 1-7 (Year: 2017).*

(Continued)

*Primary Examiner* — Romain Jeanty
(74) *Attorney, Agent, or Firm* — Clayton, McKay & Bailey, PC

(57) ABSTRACT

Systems and methods presented herein provide a server that receives a service request from a user device. The server matches the service request against one or more technician profiles. Then the server sends a message to a corresponding technician device to accept the service request and starts an acceptance timer. If the technician accepts, the server sends a control application to the user device for installation. The user can enter a PIN received from the server into the control application, which then shares control of the user device with the technician device. The technician device can cancel the service request during a grace period. Otherwise, the technician must complete the service request. The control application can notify the server whether the service request was completed, and the server can update a score in the technician profile accordingly.

20 Claims, 9 Drawing Sheets

(56) References Cited

U.S. PATENT DOCUMENTS

| | | |
|---|---|---|
| 2002/0152401 A1 | 10/2002 | Zhang |
| 2005/0114195 A1 | 5/2005 | Bernasconi |
| 2007/0250370 A1 | 10/2007 | Partridge |
| 2008/0046269 A1* | 2/2008 | Lopez ................ G06Q 10/0631 |
| | | 705/305 |
| 2010/0017254 A1 | 1/2010 | Butler |
| 2010/0063957 A9 | 3/2010 | Nevin |
| 2013/0103749 A1 | 4/2013 | Werth |
| 2013/0103973 A1 | 4/2013 | Werth |
| 2014/0119531 A1 | 5/2014 | Tuchman |
| 2016/0132816 A1* | 5/2016 | Lush .............. G06Q 10/063112 |
| | | 705/7.14 |
| 2016/0364250 A1* | 12/2016 | Seibert ................... G06F 9/453 |
| 2017/0169708 A1 | 6/2017 | Brown |
| 2018/0025309 A1 | 1/2018 | Absher |

OTHER PUBLICATIONS

Barlett et al "Technical Support Document for Version 3.9.1 of the COMcheck Software", Sep. 2012, US Department of Energy, pp. 1-237 (Year: 2012).*

* cited by examiner

EDIT SKILLS

PLEASE SELECT A FEW SKILLS SETS THAT YOU HAVE SO WE CAN TAILOR THE JOBS YOU GET TO SET YOU UP FOR SUCCESS!

DONE

COMPUTER SUPPORT
5 SKILLS TO CHOOSE FROM
WINDOWS ⊘  APPLE MAC ⊘

WI-FI & NETWORK
3 SKILLS TO CHOOSE FROM

DIY WEBSITE SUPPORT
5 SKILLS TO CHOOSE FROM

DOMAIN & HOSTING SUPPORT
9 SKILLS TO CHOOSE FROM

MOBILE & TABLETS
4 SKILLS TO CHOOSE FROM
APPLE IOS ⊘  ANDROID ⊘

SMART HOME
2 SKILLS TO CHOOSE FROM

TV & AUDIO SUPPORT
8 SKILLS TO CHOOSE FROM

BUSINESS SUPPORT
2 SKILLS TO CHOOSE FROM

CAR TECH SUPPORT
1 SKILLS TO CHOOSE FROM

DYNAMIC LIVE CONNECTIONS FOR ON-DEMAND TECHNICAL SUPPORT

CROSS REFERENCE TO RELATED APPLICATIONS

This application is a continuation of U.S. application Ser. No. 16/578,315, filed Sep. 21, 2019, which claims priority to provisional application No. 62/734,976, titled "Dynamic Live Connections for On-Demand Technical Support," filed Sep. 21, 2018. Application No. 62/732,601 is also incorporated by reference in its entirety.

BACKGROUND

As the world becomes more reliant on computers in every facet of life, so to do we rely on technical support for those machines. Technical support typically is inconvenient, time consuming, and difficult both for the customer and the technician. Generally, the customer must first determine who to request technical support from. This can require some knowledge of what the technical issue is, which the customer may not have a full grasp on. Then, the technician must be available to assist. If not, the customer may need to contact multiple technicians before finding one with availability. It can take multiple iterations of explaining a problem before the technical issue is even explored for potential solutions.

Companies have generally tried to automate parts of this process. A company may have a web portal for allowing customers to submit help requests, for example. But even this technological approach has problems. First, companies may try to create webpages with common technical issues and walkthroughs. But these are often limited and become quickly outdated as software, hardware, and operating system versions change. Second, companies may not have the resources to expend on a large technical support staff. The on-staff employees can be underutilized some days and overwhelmed on others. On days when underutilized, the company is needlessly incurring extra expense. When overutilized, the customers can become annoyed at the lengthy wait times.

Additionally, because computers include hardware and software from many vendors, the OEM manufacturer or OS vendor may not ultimately be able to solve the issue. Instead, they may lack the authority to assist with an issue that crosses over into hardware or software that is not sold or controlled by their organization. This can lead to more delays and confusion for the customer, who then embarks on a quest for technical support from a different company altogether.

Some technologies allow for screen sharing to help a customer solve an issue. However, installing software and providing access to a remote technical support agent each time technical support is needed can also open the computing device up to vulnerabilities.

Therefore, a need exists for a system that provides dynamic live connections for on-demand technical support.

SUMMARY

The examples described herein specifically address technical problems and limitations of current technical support systems. The examples include a server that receives a service request from a customer's user device remote from the server. The service request can include selections the customer makes in a graphical user interface ("GUI") on the user device. The GUI can be part of an application installed on the user device or can be part of a browser running a web application.

The service request including at least a support category. The GUI can include multiple support categories and, in an example, subcategories. Example support categories can include computer support, website support, mobile and tablets, virus removal, smart home, networking, and cyber security, among others.

The server can match information from the service request against information in technician profiles to select a technician. Each technician can have a corresponding technician profile. The technician profile can indicate which support categories the technician can work on. The server can build the technician profiles based on tests of technician abilities and scores that are maintained for the service categories based on the success and failure of a technician to solve past service requests. Other information, such as rate information, bank account information, and the like can be stored in the technician profile. The technician profile can also indicate at least one technician device associated with the technician. The technician device can be contacted by the server to notify the technician that they have been selected for the service request.

The server can start an acceptance timer, within which the technician can accept the service request. If the technician does not accept, the server can contact another technician.

The server can also send a control application for installation on the user device. The control application can give the technician device control over the user device, in an example. The user can select an option to grant or deny control to the technician device in an example.

To allow the user to launch the control application and communicate with the technician device, the server can send a password to the user device for entry into the application. The PIN can allow the server to mediate communication between the user device to a technician device and selected technician device, in an example.

The server can later receive a message indicating whether the service request was completed. In one example, this is sent from the control application. If the technician cancels after a grace period has expired, the control application can notify the server. The server can then deduct a score in the technician profile. The score can be associated with the support category in an example. Thus, the server can update a technician profile associated with the technician based on the message.

While a server example is explained, a web server is not required in all examples. Instead, the system can operate based on an application executing on a computing device operated by the user, in an example.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3A is an exemplary illustration of a GUI on a technician device;

DESCRIPTION OF THE EXAMPLES

Reference will now be made in detail to the present exemplary examples, including examples illustrated in the accompanying drawings. Wherever possible, the same reference numbers will be used throughout the drawings to refer to the same or like parts. The described examples are non-limiting.

In one example, a user can receive technical support regarding a variety of service requests. This can be done using an application on the user device or by accessing a web application using the user device. The application can present a GUI on the user device. The GUI can allow the user to select a category for technical support. This can generate a server request that is received by a server.

The server can match the server request with an available technician based on a comparison with stored technician profiles. The technician can be assigned to one or more technical competencies, which can be saved in the technician profile. For example, a first competency can be networking, and a second competency can be personal computer ("PC") setup. The competencies can be used as part of determining which technicians are available to solve which problems.

The technician can then accept the job within a time period. A GUI on the technician device can indicate the period for acceptance. The server can send a password, such as a PIN, that is displayed on the GUI. The user can enter the PIN into a control application, which can be part of the same application as the GUI or separate. In one example, the user can also enter the PIN in a control application on a different (i.e., second) device. For example, the user can receive the PIN on their phone and enter the PIN into a control application on a personal computer where the technical issue exists. This can allow the user to schedule a technician from a first (working) device and grant access to a second device where problems exist, in an example. Alternatively, the user can enter the PIN on the first device, allowing the technician to control the same device that executes the GUI. Based on the PIN, the server can authenticate the user and send an access link to the technician device. The technician device can connect with the control application on the device where the PIN was entered. Alternatively, the PIN can cause the user device to connect to the technician device.

Figure 1A:
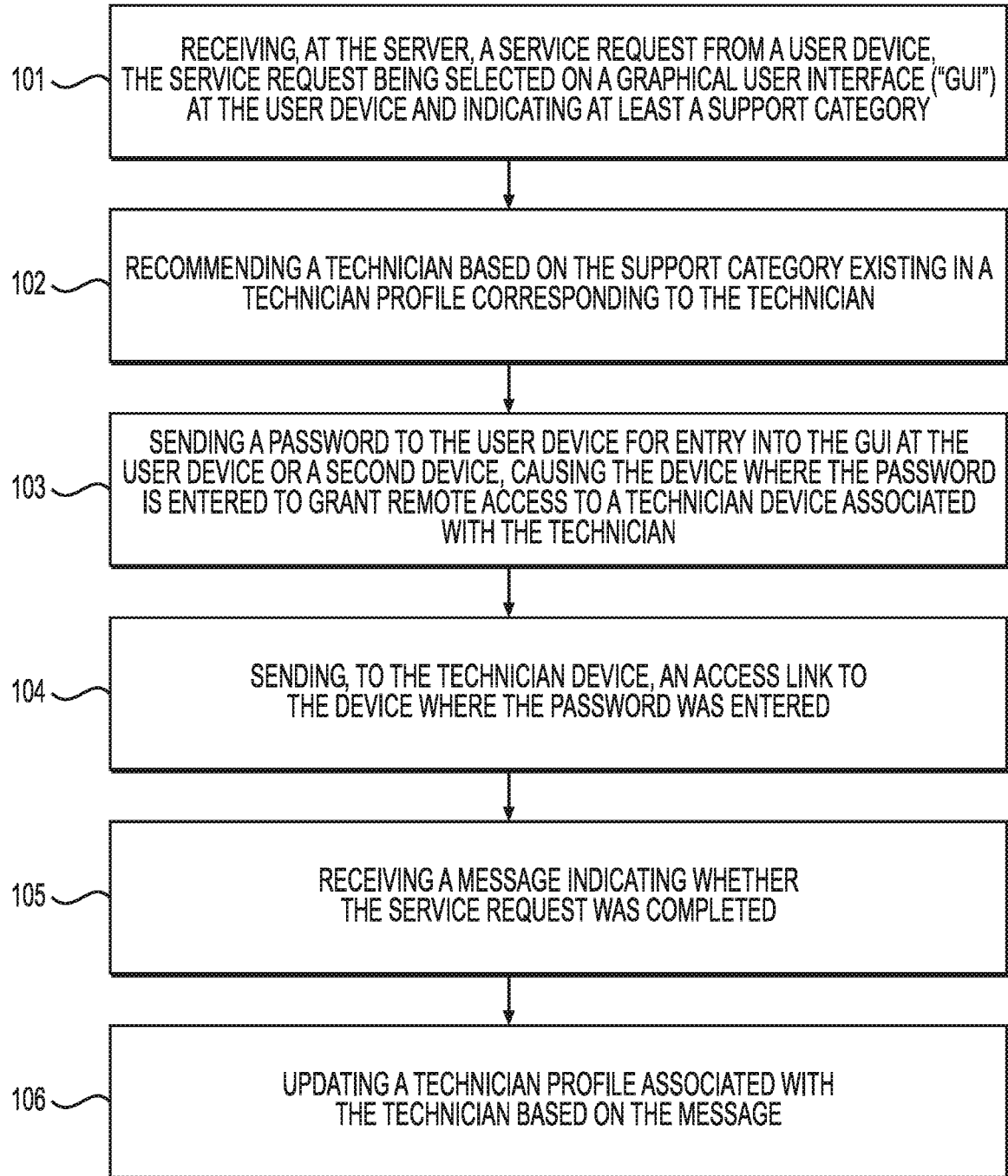
FIG. 1A is an exemplary flow chart for dynamic remote technical support.

FIG. 1A is an exemplary flow chart for dynamic remote technical support. At stage 101, a licensing server can receive a service request from a user device. The service request can be selected by a user on a graphical user interface ("GUI") at the user device. The service request can indicate at least one support category and can also indicate needed competencies. The user device can be any processor-enable device, such as a phone, laptop, or tablet.

At stage 102, the server can recommend a technician that has based on the support category matching competencies in a technician profile corresponding to the technician. For example, one or more competencies can be linked to one or more technical issues selectable by the user or determined by the system. Competencies can include computer support, website support, Wi-Fi and network support, domain and hosting support, mobile and tablets, smart home, television and audio support, business support, and car tech support. Those competencies can have subcategory skills as well, in an example.

The server can contact the technician device, allowing the technician a time window to accept the job. The server can also send information about the technician to the user device, in an example.

At stage 103, the server can send a password to the user device for use in giving device access to the technician. The user can enter the password into the GUI at the user device or a second device, depending on which device needs technical assistance. The device where the password is entered (e.g., the user device or the second device) can then grant remote access to a technician device associated with the technician.

In one example, entering the password into the control application at either device causes that device to contact the server, which then sends the technician device a link to the device where the password was entered at stage 103. In one example, stage 103 can include the server establishing a secure channel between the devices. An application on the technician device can receive a live screen from the user device (or second device). The technician can take control of that device based on the connection with the control application.

The technician can attempt to fix the issue. During this time, a video or text chat window can open on the user device or second device, allowing discussion between the technician and the user. The communication window can be part of the control application, in an example. It can also be part of the GUI where the PIN was received at stage 103.

At stage 105, the server can receive a message indicating whether the service request was completed. For example, if the technician finishes the job, the technician can select a button indicating the job is complete. If no fix was attained, the user or technician can select a different button for that. Based on the job being complete, at stage 106 the server can update the technician profile.

Figure 1B:
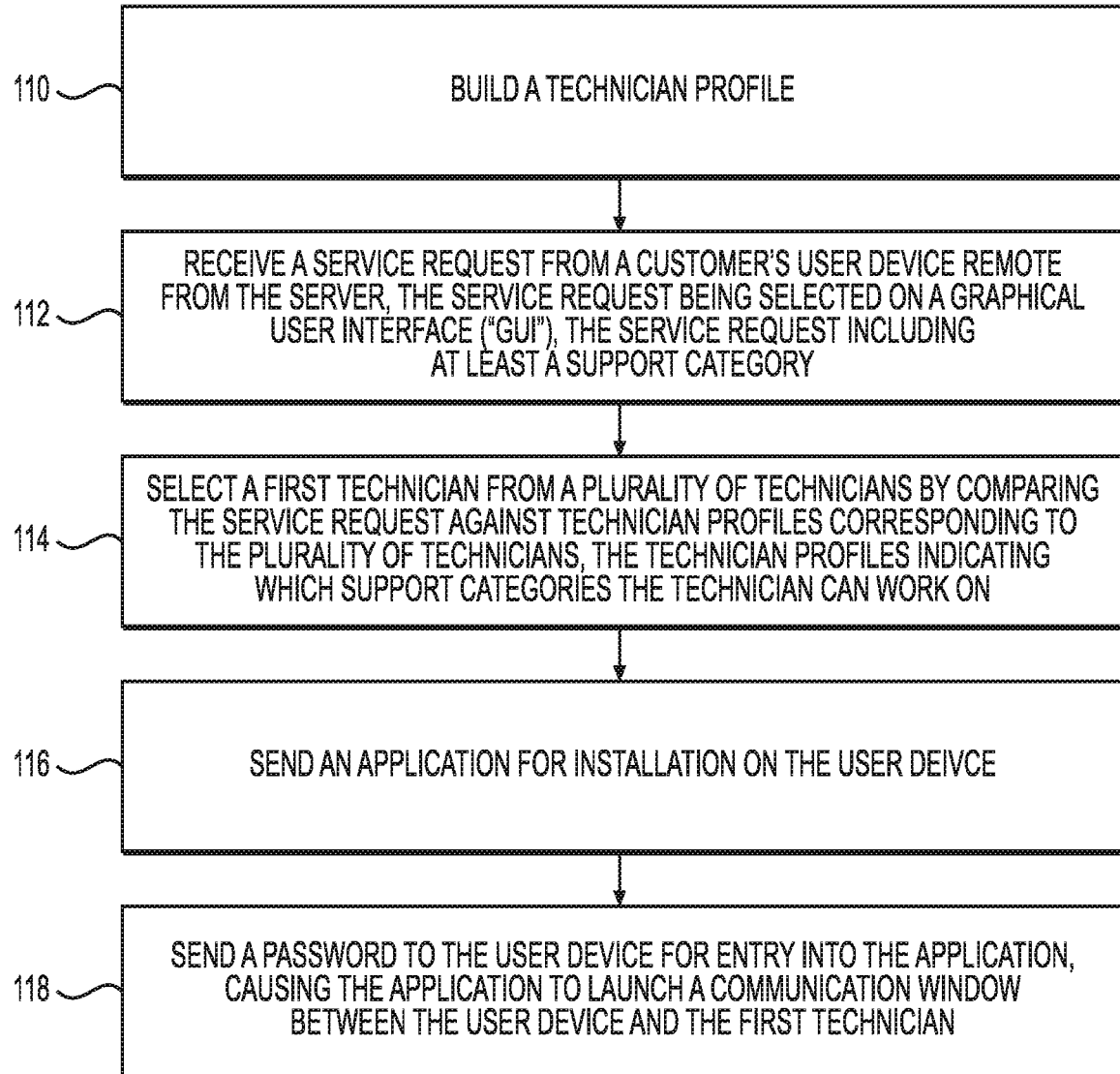
FIG. 1B is an exemplary flow chart for dynamic remote technical support.

FIG. 1B is another exemplary flow chart. At stage 110, the server can add or update a technician profile associated with a technician. To sign up to use the system, the technician can enter information at a server. The server can receive information that allows for a background check. The background check can be automated, in an example. This can allow for fast approval of the technician. Alternatively, the background check can be overseen by an administrator to ensure any technicians allowed into the system are reliable, safe, and qualified.

The technician can select support categories for which they would like to provide technical support. The server can then issue a quiz for one or more of the categories to ensure the technician's competence. If the technician passes both the competency and background checks, the server can update the technician profile to allow the support category.

In one example, the technician can then submit payment information to allow the server to direct funds to the technician from a payment provider. The payment provider can also use the technician information in an underwriting process, in an example. A registered technician can then be emailed an invitation to a training course for using the control applications and the features of the GUI.

In one example, the system can be licensed to an enterprise for business-to-business applications. For example, an information technology ("IT") department can use the system to provide an on-site or remote helpdesk solution. The technician profiles can be set by an administrator for different technicians. The licensee can use the platform for internal use in its IT department or for use by its third-party IT support vendor. The technicians can be employees of the licensee or its third-party IT support vendor (e.g., licensee employees). The licensee employees can have the ability to use the smartphone platform applications as well as the desktop platform applications for remote support from the licensee employees.

At stage 112, the server can receive a service request from a user. The user device can send a service request based on the user selecting a support category in GUI of the application. Then, at stage 114, the server can select a technician based on matching the service request against allowed support categories in technical profiles. The server can also consider other factors, such as whether the technician device is online and whether the technician is engaged in another service request. In addition, the server can ensure the technician's account status is approved or monitored. A technician's account can be monitored when their rating falls below 4 stars. In that case, an administrator can join the shared session to oversee the technician's use of the control application in real time and offer advice to the technician during the real-time technical support. The server can send the link to the administrator device, causing a three-way session that screen shares the user's screen.

At stage 116, the server can send a control application to a device for installation. In one example, the user device already has the control application functionality built into the same application that displays the GUI. However, a second device can download the control application if needed. The destination device (to be controlled) can be identified in the service request in an example. This can allow the user to make the service request from a different device (e.g., the user device) than the one being serviced (e.g., the second device), in an example. Alternatively, the user device sending the service request can be the same one receiving service from the technician.

The control application can provide a technician with access to the user device in an example. This can include setting up a conversation window or granting control over the device.

At stage 118, the user device can receive a PIN from the server for entry into the control application. This can be used for authentication purposes, and to allow the server to connect the correct technician device to the user device. In another example, no PIN is needed, and the channel opens automatically based on the GUI having already received this permission from the user.

Figure 2:
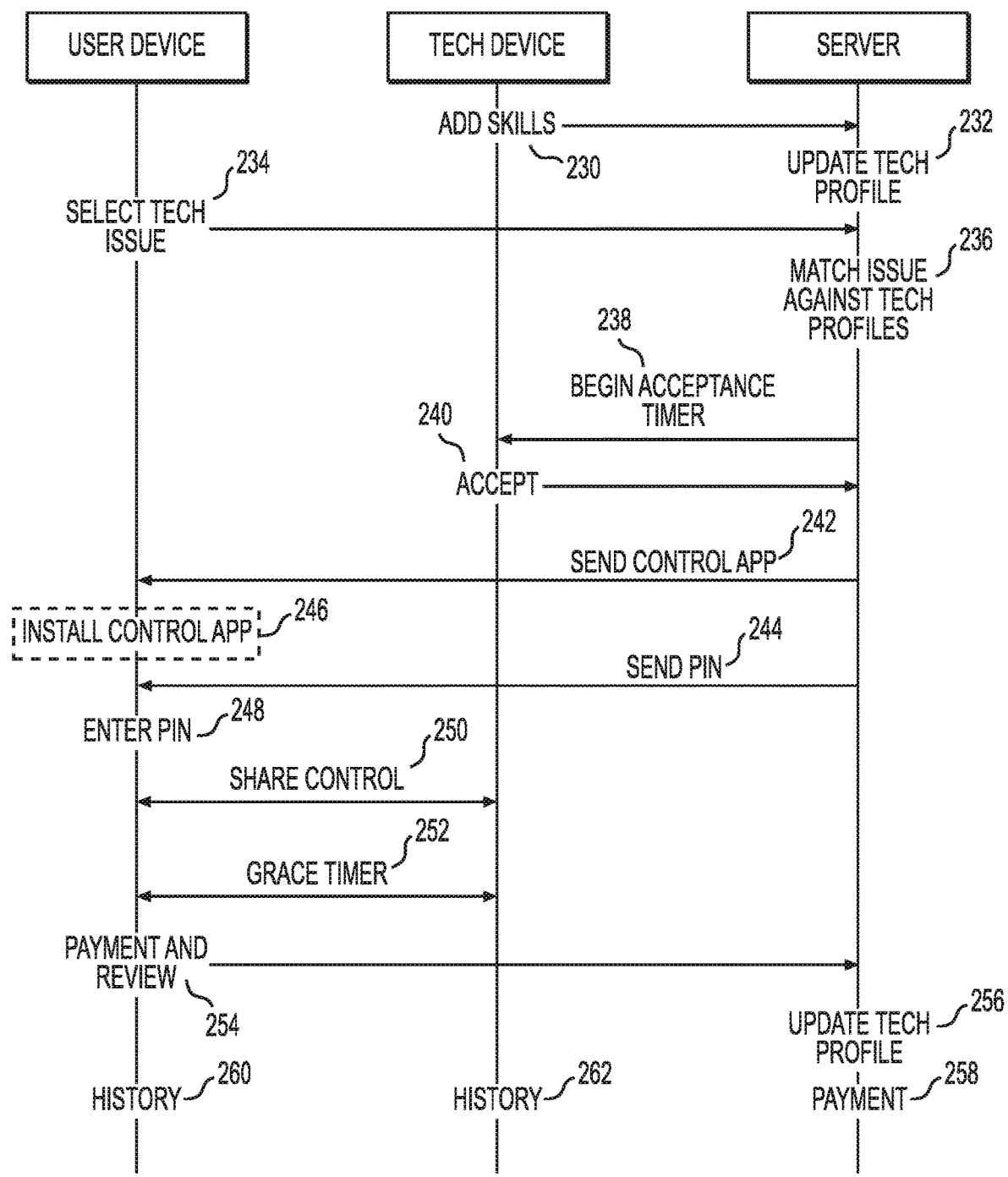
FIG. 2 is an exemplary sequence diagram for dynamic remote technical support.

FIG. 2 is an exemplary sequence diagram. At stage 230, the technician adds skills using their technician device. They can do so using a GUI that is part of an application or web application. The server can quiz and background check the technician. If the technician passes both, at stage 232 the server can update the technician profile to include the service category or categories.

At stage 234, the user can select a service category on their user device. The application sends a corresponding service request to the server. At stage 236, the server can match the service category of the service request with technician profiles stored in the system. While this is happening, a GUI screen on the user device can notify the user of the server's attempt to select a technician. A timer or status indicator can indicate that the server is making the selection or reaching out to a potential technician. In one example, potential technicians are displayed. When a technician accepts, the user can be presented with that technician's information on the GUI. The GUI can also prompt the user to determine whether they need to install the control application at a second device.

At stage 238 the server can notify the selected technician by sending a message to the technician device indicated in the technician profile. The server can also begin an acceptance timer, limiting how long the technician has to accept the service request. If the technician does not accept within that time period, the server can select another technician and retry stage 238.

At stage 240, the technician can accept the service request. In response, at stage 242, the server can send the control application for installation on the device being serviced (if not already installed). The user can elect to install it at stage 246 if the device does not already have the functionality. In one example, this can occur if the device being serviced is different than the user device.

The server can also send a PIN (e.g., password) to the user device that is presented in the GUI as part of stage 244. The user can enter this PIN into the control application to authenticate the technical support at stage 248. This can allow the server to open a socket between the user device (or a second device) and the technician device, in an example. If the technician's rating is below a threshold, the socket can also be opened to an administrator device. This can allow an administrator to review the technician's work and offer additional assistance in real time.

The user device can then present an option for granting control to the technician device. The user can elect to share control at stage 250, which can grant control of the user device through a virtual desktop on the technician device.

A grace timer 252 can allow the technician to cancel out of the service request during a time period. For example, if the technician can judge that they cannot solve the problem, the grace period allows for turning the job over to a different technician.

After the job ends, payment can be automatically deducted from the user at stage 254. The server can update the technician profile at stage 256. If the job was a success, the technician profile can be updated to reflect an increased reputation. A score for the particular service category can increase, increasing the chances of the server selecting this technician again for that service category.

In one example, to receive payment, the technician is required to fill out a post job summary report. The job summary report can include what the issue was, how it was resolved, and tips on how to prevent the issue from reoccurring. Tips can also indicate what actions to take in the future if the issue arises again. The report can then be sent in an email to the customer after submission. In one example, the report can be added to the histories of the user and the technician, which can be retrieved on the GUI at stages 260 and 262, respectively.

At stage 258, the server can issue payment to the technician according to the rate agreed by the technician. At stages 260 and 262, both the user device and technician device can pull up histories showing this transaction and prior service requests using the system.

Figure 3B:
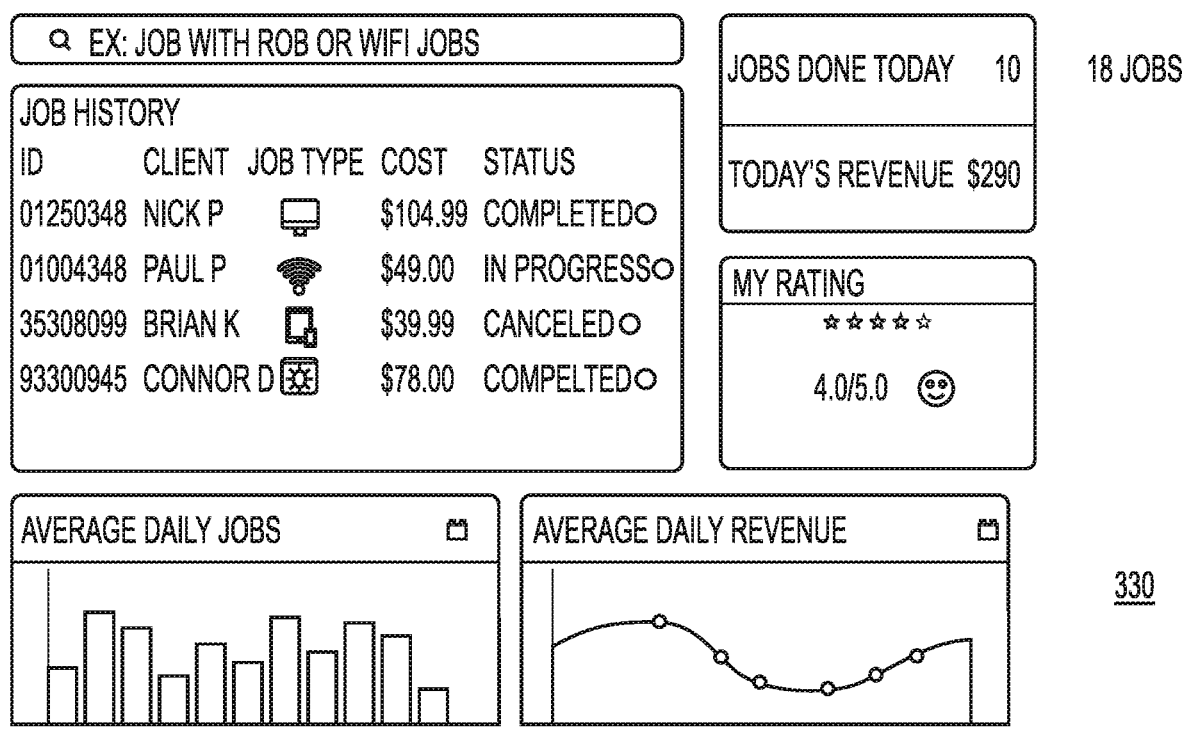
FIG. 3B is an exemplary illustration of a GUI on a technician device.
Figure 3C:
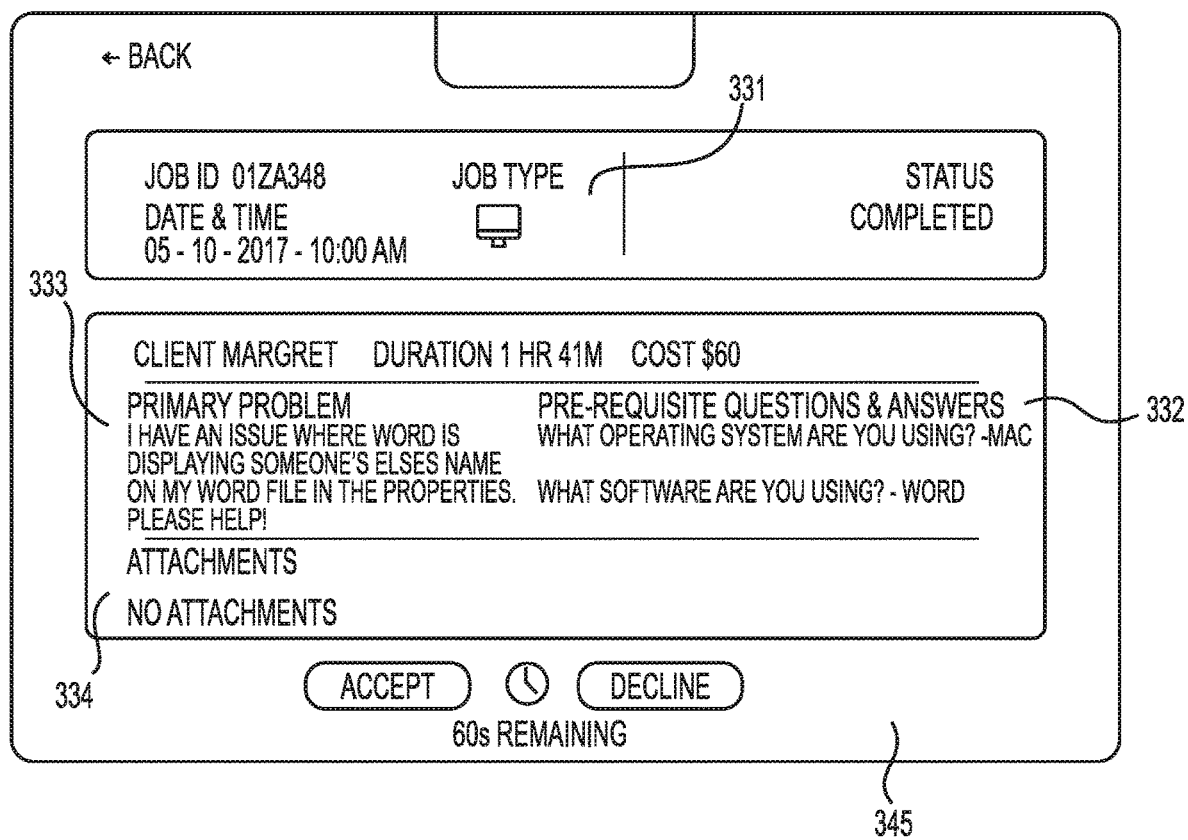
FIG. 3C is an exemplary illustration of a GUI on a technician device.

FIGS. 3A-3C are exemplary illustrations of screens of a GUI on a technician device. The GUI can allow the technician to create a technician profile, view a dashboard with their jobs and ratings, and perform functions related to their jobs within the system. Turning to FIG. 3A, Screen 315 can allow a technician to attempt to add competencies and subset skills to their technician profile. For example, the computer support competency can be added. Subset skills pertaining to particular operating systems, such as WINDOWS and APPLE, can be added to the computer support competency. Various example competencies are shown on the screen 315 for selection by the technician. The technician can also to set up their payment details for verification from the payment provider.

FIG. 3B is a dashboard 330 showing job history, jobs done today, rating, average revenue, and other information for a technician. The dashboard 330 can allow the technician to analyze their job history and earnings to ensure their work is on a positive trend. The GUI can show a job history with completed and pending jobs. By clicking a job in the job history list, billing details and the job summary can be retrieved and displayed. This can include displaying the post job summary report, in an example.

The dashboard 330 can also display the technician's rating based on user reviews. The rating can be numerical and highlight differently based on whether it exceeds or falls below a threshold for requiring administrative monitoring.

FIG. 3C illustrates a GUI screen 345 that summarizes a job for a technician. The summary can be displayed at the technician device prior to the technician accepting the job, in an example. The summary can include a job type 331 (aligning with a competency), any attachments 334 received from the user, and a user description of the primary problem 33. The user can also be prompted to answer preliminary questions 332, the answers to which can display on the screen 345. The preliminary questions 332 can be different depending on the job type selected by the user. Additionally, technicians can specify their own preliminary questions for particular job types, and those can be stored in technician profiles. So, when a technician is paired with a user, the user can be presented with and answer that technician's particular preliminary questions.

In one example, the summary can continue to update during the job, such as by tracking the duration and time remaining. The time remaining can indicate a grace period in which the technician can still decline the job without rating penalty.

Figure 3D:
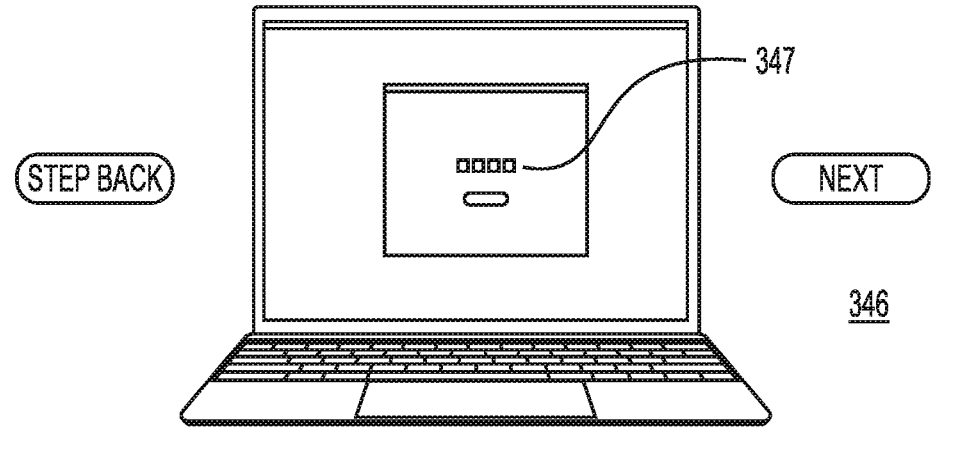
FIG. 3D is an exemplary illustration of a GUI on a customer device.

FIG. 3D includes exemplary illustrations of GUI screens 346, 348 displayed on a user device. Screen 346 prompts the user to download and install a control application on a second device. In this illustration, the second device is illustrated as a laptop, but any type of second device is possible. Additionally, screen 346 instructs to enter the password 347 (e.g., PIN) in the GUI of the control application once it is installed.

Similarly, screen 348 can be presented on the GUI when the user is fixing a technical issue on the user device. A password 349 can be presented for entering into the GUI to grant access to the technician and establish the communication channel. The control application can allow the GUI can to open a conversation window. A GUI screen can also indicate which user device will be controlled by the technician.

Figure 4:
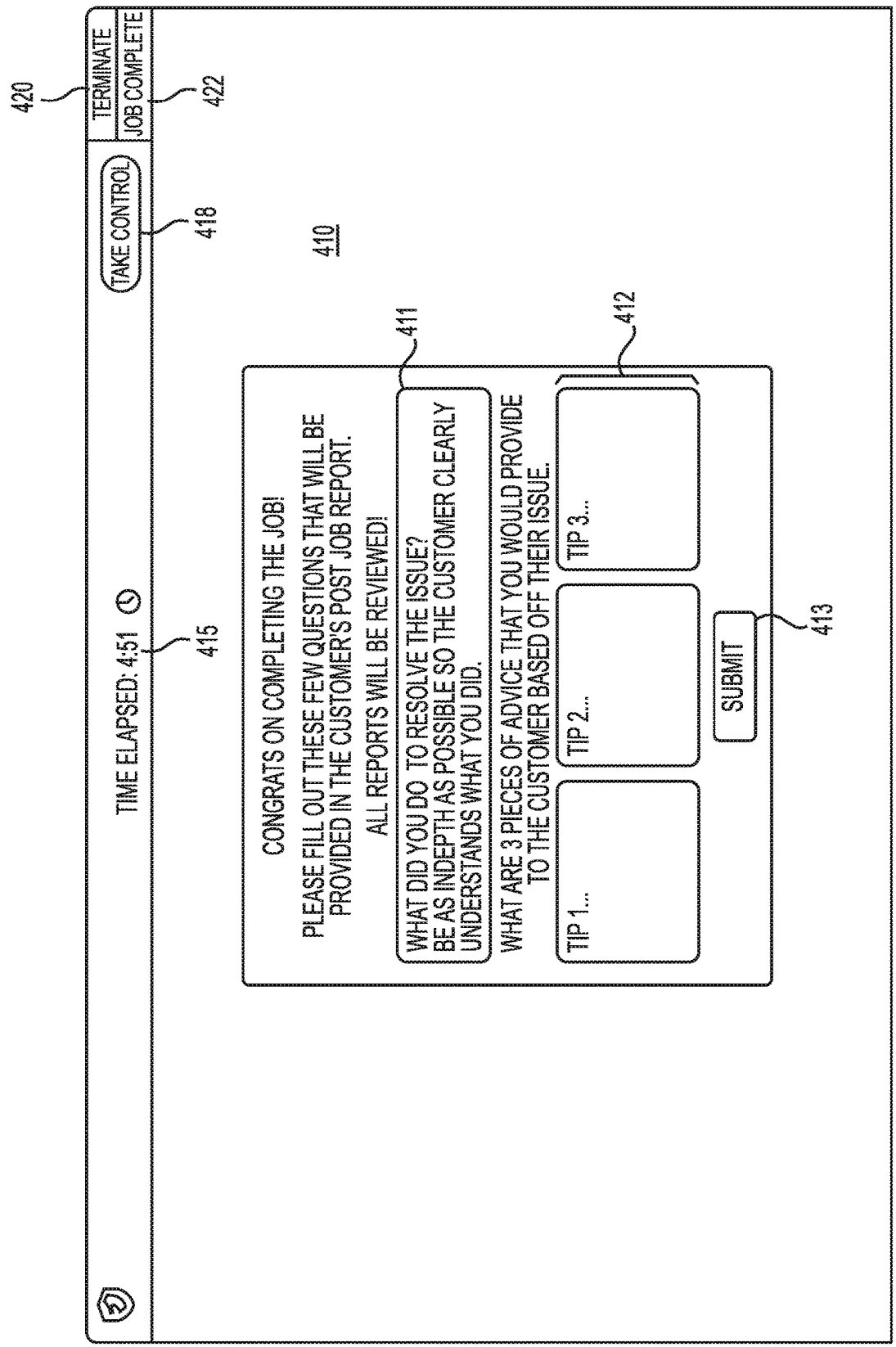
FIG. 4 is an exemplary illustration of a GUI on a technician device.

FIG. 4 is an exemplary illustration of a screen 410 of the GUI on a technician device. In one example, the GUI presents the screen of the user device (or second device) and allows the technician to take control, such as by using button 418. On the other side, the user (customer) can mute the microphone of the computing device, stop screen sharing, or terminate the job. In one example, after the grace period, the technician cannot terminate the job without receiving a negative work score. Either can terminate using, for example, a terminate button 420. However, once a threshold amount of time has elapsed, displayed at 415, then terminating by the technician can either be disabled or result in a score decrease. Selecting the terminate button 420 can also cause the GUI to ensure that the user or technician meant to select that button before effecting the termination.

When the job is completed successfully, that can be indicated by either party selecting the job complete button 422. This can cause a form for creating a post job summary report to display on the screen 410, as shown in FIG. 4. On the technician device, the technician can then provide information that can help the user or other technicians in the future. For example, in field 411 the technician can briefly describe how they resolved the issue. The technician can also leave tips in fields 412. The tips can help the user avoid the problem in the future or can instruct the user in what to do if the issue reoccurs. Once complete, the technician can submit the post job summary report by selecting the submit button 413.

The post job summary report can then be stored at the server. It can be retrieved for troubleshooting purposes. It can also be used to refute credit card disputes. One problem with traditional approaches to provide remote technical support is that a high rate of charge backs occurs. This prevalent issue has greatly slowed the adoption of remote technical support solutions. But by sending the post job summary report to a credit card company, the credit card company will have the information needed to resolve a charge back. More technicians can therefore work using the systems disclosed herein without the hassle of the unpaid task of compiling evidence to refute chargebacks.

In one example, the post job report is received by the customer at the user device. The report can include a profile picture of the technician, a time stamp, the length of the job, the problem, and the solution. The report can also list the three tips on how to prevent the issue from reoccurring. On a screen on the user device, the user can also leave feedback at the end of the job that can impact the work score.

Other GUI screens (such as disclosed in the provisional application) can assist the technician in managing their workload. For example, a screen can show a technician's jobs in queue. The GUI can indicate an incoming service request, with options to accept or decline. In this example, a grace period timer can show how many seconds remain to accept or cancel the job. The GUI can include a chat window in which the user and technician can communicate. The GUI can also display a list or rules to the technician. The GUI can include a cancelation screen, warning the technician that their score will be affected since the grace period has elapsed.

Figure 5:
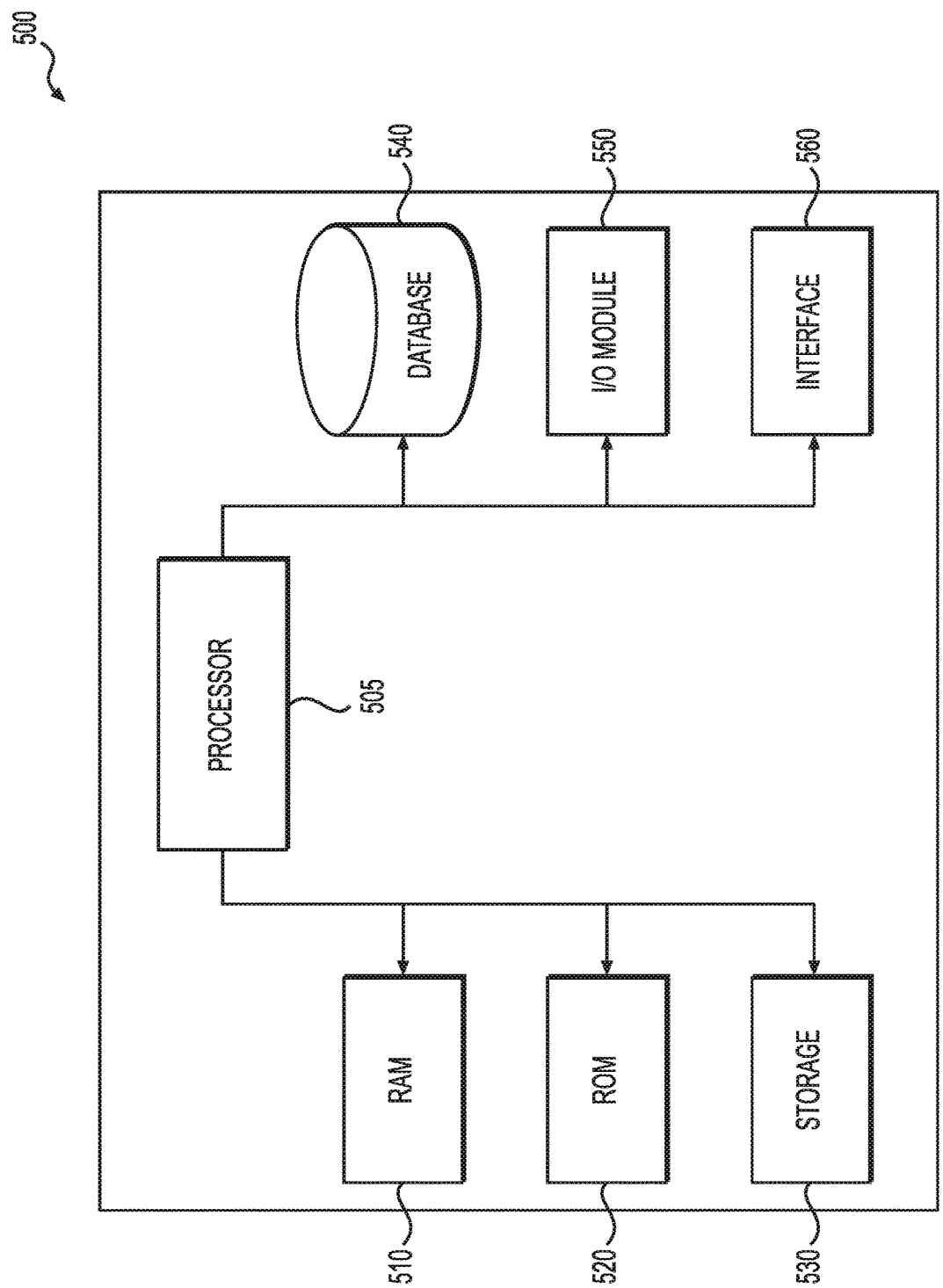
FIG. 5 illustrates exemplary system components for dynamic remote technical support.

FIG. 5 depicts an exemplary processor-based computing system 400 representative of the type of user device, technician device, or server described herein. Continuing with FIG. 5, the computing system 500 is exemplary only and does not exclude the possibility of another processor- or controller-based system being used in or with one of the aforementioned components. Additionally, a server or other user device need not include all the system hardware components in an embodiment.

In one aspect, system 500 may include one or more hardware and/or software components configured to execute software programs, such as software for storing, processing, and analyzing data. For example, system 500 may include one or more hardware components such as, for example, processor 505, a random-access memory (RAM) module 310, a read-only memory (ROM) module 520, a storage system 530, a database 540, one or more input/output (I/O) modules 550, and an interface module 560. Alternatively, and/or additionally, system 500 may include one or more software components such as, for example, a computer-readable medium including computer-executable instructions for performing methods consistent with certain disclosed embodiments. It is contemplated that one or more of the hardware components listed above may be implemented using software. For example, storage 530 may include a software partition associated with one or more other hardware components of system 500. System 500 may include additional, fewer, and/or different components than those listed above. It is understood that the components listed above are exemplary only and not intended to be limiting.

Processor 505 may include one or more processors, each configured to execute instructions and process data to perform one or more functions associated with system 500. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 5, processor 505 may be communicatively coupled to RAM 510, ROM 520, storage 530, database 540, I/O module 550, and interface module 560. Processor 505 may be configured to execute sequences of computer program instructions to perform various processes, which will be described in detail below. The computer program instructions may be loaded into RAM for execution by processor 505.

RAM 510 and ROM 520 may each include one or more devices for storing information associated with an operation of system 500 and/or processor 505. For example, ROM 520 may include a memory device configured to access and store information associated with system 500, including information for identifying, initializing, and monitoring the operation of one or more components and subsystems of system 500. RAM 510 may include a memory device for storing data associated with one or more operations of processor 505. For example, ROM 520 may load instructions into RAM 510 for execution by processor 505.

Storage 530 may include any type of storage device configured to store information that processor 505 may need to perform processes consistent with the disclosed embodiments.

Database 540 may include one or more software and/or hardware components that cooperate to store, organize, sort, filter, and/or arrange data used by system 500 and/or processor 505. For example, database 540 may include user-specific information, including password information, along with the custom objects and customization data. Alternatively, database 540 may store additional and/or different information. Database 540 may also contain a plurality of databases that are communicatively coupled to one another and/or processor 505, which may be one of a plurality of processors utilized by server 530.

I/O module 550 may include one or more components configured to communicate information with a user associated with system 500. For example, I/O module 550 may include a console with an integrated keyboard and mouse to allow a user to input parameters associated with system 500. I/O module 550 may also include a display including a graphical user interface for outputting information on a monitor. I/O module 550 may also include peripheral devices such as, for example, a printer for printing information associated with system 500, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 560 may include one or more components configured to transmit and receive data via a communication network, such as the Internet, a local area network, a workstation peer-to-peer network, a direct link network, a wireless network, or any other suitable communication platform. For example, interface 560 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is understood that the examples can operate as an application or plugin on a cloud server. Also, the terms customer and user are used interchangeably. It is intended that the specification and examples be considered as exemplary only, with a true scope and spirit of the invention being indicated by the following claims.

What is claimed is:

1. A system for live technical support, including:
   a database that stores technician competencies; and
   a server that executes instructions to perform stages comprising:
      compiling the technician competencies after the technician passes one or more competency quizzes;
      receiving, at the server, a service request from a user device, the service request being selected on a graphical user interface ("GUI") at the user device and indicating at least a support category;
      recommending a technician based on competencies corresponding to the technician, wherein at least one of the competencies relates to the support category;
      providing a platform that facilitates communication between a technician device associated with the technician and the user device;
      receiving a message indicating whether the service request was completed; and
   updating a stored technician profile associated with the technician based on the message.

2. The system of claim 1, wherein the support category is selected from the group consisting of computer, laptop, smartphone, Wi-Fi, network, mobile device and tablet.

3. The system of claim 1, wherein the support category is selected from the group consisting of website, domain, hosting, smart home, television, audio and car tech.

4. The system of claim 1, wherein the service request identifies an operating system version, wherein the server matches the operating system version to a technician's competencies.

5. The system of claim 1, further comprising the technician providing initial questions for user to further diagnose the issue.

6. The system of claim 1, further comprising allowing the server to open a socket between a user device and the technician device wherein the user or technician may use a second device.

7. The system of claim 1, further comprising providing a secure channel between the user and technician devices that allows for text or video chat.

8. The system of claim 1, further comprising incorporating a background check on the technician.

9. The system of claim 1, further comprising providing additional competency quizzes to add to a technician's competencies.

10. The system of claim 1, comprising rating the technician, wherein the rating in the technician's profile increases or decreases based on support results.

11. The system of claim 1, further comprising:
sending a password to the user device for entry into the GUI at the user device or a second device, causing the device where the password is entered to grant remote access to a technician device associated with the technician;
sending, to the technician device, an access link to the device where the password was entered;
providing an acceptance timer in which the selected technician can accept the service request; and
providing a grace period within which the technician can cancel acceptance of the service request, wherein canceling after the grace period causes an application to send a communication to the server that the server uses to deduct a score in the technician profile of the technician.

12. The system of claim 1, further comprising the technician providing the user tips on how to keep an issue from reoccurring.

13. The system of claim 1, further comprising generation of a job summary report.

14. The system of claim 13, wherein the job summary report includes the technician profile, time stamp showing the length of the job, the user issue and solution.

15. The system of claim 13, wherein the job summary is stored on the server and can be retrieved for troubleshooting purposes.

16. The system of claim 13, wherein the technician is being paid by the user for the service provided.

17. The system of claim 13, wherein the platform is used for business-to-business applications.

18. A method comprising:
compiling and storing the technician competencies after the technician passes one or more competency quizzes;
receiving, at a server, a service request from a user device, the service request being selected on a graphical user interface ("GUI") at the user device and indicating at least one support category;
recommending a technician based on the support category existing in a technician profile corresponding to the technician;
providing a platform that facilitates communication between a technician device associated with the technician and the user device; and
receiving a message indicating whether the service request was completed; and
updating a technician profile associated with the technician based on the message.

19. The method according to claim 18, further comprising:
providing and acceptance timer in which the selected technician can accept the service request; and
providing a grace period within which the technician can cancer acceptance of the service request, wherein canceling after the grace period causes an application to reduce the technician's rating in the technician's profile.

20. The method according to claim 18, further comprising a job summary report.

* * * * *